US009886329B2

(12) United States Patent
McKenney

(10) Patent No.: US 9,886,329 B2
(45) Date of Patent: Feb. 6, 2018

(54) SCALABLE RCU CALLBACK OFFLOADING

(71) Applicant: International Business Machines Corporation, Armonk, NY (US)

(72) Inventor: Paul E. McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 14/750,340

(22) Filed: Jun. 25, 2015

(65) Prior Publication Data
US 2016/0378573 A1    Dec. 29, 2016

(51) Int. Cl.
G06F 9/52    (2006.01)
G06F 9/50    (2006.01)
G06F 9/48    (2006.01)

(52) U.S. Cl.
CPC ............ *G06F 9/526* (2013.01); *G06F 9/4881* (2013.01)

(58) Field of Classification Search
CPC ........ G06F 9/52; G06F 2209/523; G06F 9/30; G06F 7/30; G06F 9/50
See application file for complete search history.

(56) References Cited

U.S. PATENT DOCUMENTS

| 5,442,758 A | 8/1995 | Slingwine et al. |
| 5,608,893 A | 4/1997 | Slingwine et al. |
| 5,727,209 A | 3/1998 | Slingwine et al. |
| 6,006,247 A | 12/1999 | Browning et al. |
| 6,219,690 B1 | 4/2001 | Slingwine et al. |
| 6,662,184 B1 | 12/2003 | Friedberg |
| 6,886,162 B1 | 4/2005 | McKenney |
| 6,996,812 B2 | 2/2006 | McKenney |
| 7,191,272 B2 | 3/2007 | McKenney |
| 7,287,135 B2 | 10/2007 | McKenney et al. |
| 7,349,879 B2 | 3/2008 | Alsberg et al. |
| 7,353,346 B2 | 4/2008 | McKenney et al. |
| 7,395,263 B2 | 7/2008 | McKenney |
| 7,395,383 B2 | 7/2008 | McKenney |
| 7,426,511 B2 | 9/2008 | McKenney |

(Continued)

OTHER PUBLICATIONS

Mckenney, Getting RCU further out of the way, Aug. 2012, IBM.*

(Continued)

*Primary Examiner* — Henry Tsai
*Assistant Examiner* — Christopher A Daley
(74) *Attorney, Agent, or Firm* — Walter W. Duft

(57) ABSTRACT

In order to scale Read-Copy Update (RCU) callback offloading from no-callbacks (No-CBs) CPUs, a set of RCU callback offload kernel threads (rcuo kthreads) may be spawned and each may be assigned to one of the No-CBs CPUs to invoke RCU callbacks generated by workloads running on the No-CBs CPUs at CPUs that are not No-CBs CPUs. Groups of the rcuo kthreads may be established, with each rcuo kthread group having one leader kthread and one or more follower rcuo kthreads. The leader rcuo kthreads may be periodically awakened without waking up the follower kthreads when an RCU grace period ends and an RCU callback needs to be invoked, or when a new RCU callback arrives and a new RCU grace period needs to be started. The leader rcuo kthreads may periodically awaken their associated follower rcuo kthreads for which the leader rcuo kthreads have sole responsibility to wake.

20 Claims, 12 Drawing Sheets

(56) References Cited

U.S. PATENT DOCUMENTS

| | | | |
|---|---|---|---|
| 7,454,581 B2* | 11/2008 | McKenney | G06F 9/52 707/999.202 |
| 7,472,228 B2 | 12/2008 | McKenney et al. | |
| 7,653,791 B2 | 1/2010 | McKenney | |
| 7,689,789 B2 | 3/2010 | McKenney et al. | |
| 7,734,879 B2* | 6/2010 | McKenney | G06F 9/4881 711/150 |
| 7,734,881 B2 | 6/2010 | McKenney et al. | |
| 7,739,685 B2 | 6/2010 | Vaddagiri | |
| 7,747,805 B2 | 6/2010 | McKenney | |
| 7,814,082 B2 | 10/2010 | McKenney | |
| 7,818,306 B2 | 10/2010 | McKenney et al. | |
| 7,904,436 B2 | 3/2011 | McKenney | |
| 7,953,708 B2 | 5/2011 | McKenney et al. | |
| 7,953,778 B2 | 5/2011 | McKenney et al. | |
| 8,020,160 B2 | 9/2011 | McKenney | |
| 8,055,860 B2 | 11/2011 | McKenney et al. | |
| 8,055,918 B2 | 11/2011 | McKenney et al. | |
| 8,108,696 B2 | 1/2012 | Triplett | |
| 8,126,843 B2 | 2/2012 | McKenney et al. | |
| 8,176,489 B2 | 5/2012 | Bauer et al. | |
| 8,185,704 B2 | 5/2012 | McKenney et al. | |
| 8,195,893 B2 | 6/2012 | Triplett | |
| 8,407,503 B2 | 3/2013 | McKenney | |
| 8,495,641 B2 | 7/2013 | McKenney | |
| 8,615,771 B2 | 12/2013 | McKenney | |
| 8,706,706 B2 | 4/2014 | McKenney | |
| 8,874,535 B2 | 10/2014 | McKenney | |
| 8,924,655 B2 | 12/2014 | McKenney | |
| 8,938,631 B2 | 1/2015 | McKenney | |
| 8,972,801 B2 | 3/2015 | McKenney | |
| 9,003,420 B2 | 4/2015 | McKenney | |
| 2008/0082532 A1 | 4/2008 | McKenney | |
| 2012/0324170 A1 | 12/2012 | McKenney | |
| 2012/0331237 A1 | 12/2012 | McKenney | |
| 2013/0061071 A1 | 3/2013 | McKenney | |
| 2013/0138896 A1 | 5/2013 | McKenney | |
| 2013/0151798 A1 | 6/2013 | McKenney | |
| 2013/0152095 A1 | 6/2013 | McKenney | |
| 2014/0223242 A1* | 8/2014 | McKenney | G06F 9/526 714/54 |
| 2014/0281295 A1 | 9/2014 | McKenney | |
| 2014/0379676 A1 | 12/2014 | McKenney | |
| 2014/0380084 A1 | 12/2014 | McKenney | |
| 2015/0153817 A1 | 6/2015 | McKenney | |

OTHER PUBLICATIONS

McKenney, Read-Copy-Update, 2009, IBM.*
Podzimek, A Non-Intrusive Read-Copy-Update for UTS, 2009, Charles University in Prague.*
P. McKenney et al., "Read-Copy Update: Using Execution History to Solve Concurrency Problems," PDCS, Oct. 1998, 11 pages.
P. McKenney et al., "Read-Copy Update," 2001 Ottawa Linux symposium, Jul. 2001, 22 pages.
H. Lindar et al., "Scalability of the Directory Entry Cache," 2002 Ottawa Linux Symposium, Jun. 26, 2002, pp. 289-300.
P. McKenney et al.,"Read-Copy Update," 2002 Ottawa Linux Symposium, Jul. 8, 2002, 32 pages.
A. Arcangeli et al., "Using Read-Copy-Update Techniques for System V IPC in the Linux 2.5 Kernel," 2003 FREENIX, Jun. 14, 2003, 13 pages.
P. McKenney et al., "Using RCU in the Linux 2.5 Kernel," Linux Journal, Oct. 1, 2003, 11 pages.
P. McKenney et al., "Scaling dcache with RCU," Linux Journal, Jan. 1, 2004, 12 pages.
P. McKenney, "RCU vs. Locking Performance on Different CPUs," 2004 Linux.conf.au, 2004, 18 pages.
P. Zijlstra, "[Patch] slab: document Slab_Destroy_By_RCU", LKML.org, Nov. 13, 2008, 1 page.
D. Sarma et al., "Making RCU Safe for Deep Sub-Millisecond Response Realtime Applications," 2004 USENIX . (UseLinux track) Jun. 2004, 9 pages.
P. McKenney et al., "Extending RCU for Realtime and Embedded Workloads," 2006 Ottawa Linux Symposium, Aug. 11, 2006, 15 pages.
P. McKenney, "Sleepable RCU", LWN.net, Oct. 9, 2006, 10 pages.
T. Gleixner, High Resolution Timers / Dynamic Tics—V2, LWN.net, Oct. 31, 2006, 5 pages.
P. McKenney, "RCU and Unloadable Modules", LWN.net, Jan. 14, 2007, 4 pages.
P. McKenney, "Using Promela and Spin to verify parallel algorithms", LWN.net, Aug. 1, 2007, 11 pages.
P. McKenney, "The design of preemptible read-copy-update," LWN.net, Oct. 8, 2007, 27 pages.
T. Hart et al., "Performance of memory reclamation for lockless synchronization", Journal of Parallel and Distributed Computing, Dec. 2007, pp. 1270-1285.
P. McKenney, "What is RCU, Fundamentally", LWN.net, Dec. 17, 2007, 15 pages.
P. McKenney, What is RCU? Part 2: Usage, LWN.net,Dec. 24, 2007, 15 pages.
P. McKenney, RCU part 3: the RCU API, LWN.net, Jan. 7, 2008, 7 pages.
P. McKenney, "Integrating and Validating dynticks and Preemptible RCU," LWN.net, Apr. 22, 2008, 19 pages.
D. Guniguntala et al., "The read-copy-update mechanism for supporting real-time applications on shared-memory multiprocessor systems with Linux", IBM Systems Journal vol. 47 No. 2, 2008, pp. 221-236.
P. McKenney, "Introducing Technology Into Linux", 2008 Linux Developer Symposium, China, 2008, 47 pages.
P. McKenney, "Hierarchical RCU," LWN.net, Nov. 4, 2008, 19 pages.
P. McKenney, "Using a Malicious User-Level RCU to Torture RCU-Based Algorithms", linux.conf.au, Jan. 2009, 51 pages.
M. Desnoyers, "Low-Impact Operating System Tracing", University of Montreal, PhD Thesis, Dec. 2009, 233 pages.
P. McKenney, "RCU: The Bloatwatch Edition", LWN.net, Mar. 17, 2009, 9 pages.
P. McKenney, "Expedited "big hammer" RCU grace periods", LKML.org, Jun. 25, 2009, 2 pages.
P. McKenney, "RCU cleanups and simplified preemptable RCU", LKML.org, Jul. 23, 2009, 1 page.
P. McKenney, "Deterministic Synchronization in Multicore Systems: the Role of RCU", Aug. 18, 2009, pp. 1-9.
P. McKenney, "Simplicity Through Optimization", linux.conf.au, Jan. 2010, 109 pages.
P. McKenney, "The RCU API, 2010 Edition", LWN.net, Dec. 8, 2010, 11 pages.
J. Triplett et al., "Resizable, Scalable, Concurrent Hash Tables via Relativistic Programming", ACM-SIGOPS Operating System Review vol. 44, Issue 3, Jul. 2010, 14 pages.
M. Desnoyers et al., "User-Level Implementations of Read-Copy Update", IEEE Transactions on Parallel and Distributed Systems, vol. x, No. y, Jul. 2009, pp. 1-14.
P. McKenney, "Making RCU Safe for Battery-Powered Devices", Embedded Linux Conference, Feb. 15, 2012, pp. 1-66.
P. McKenney, "Real-Time Response on Multicore Systems: It Is Bigger Than You Think", OSPERT '12 Workshop, Jul. 10, 2012, pp. 1-34.
P. McKenney, "Getting RCU Further Out of the Way", 2012 Linux Plumbers Conference, Real Time Microconference, Aug. 31, 2012, 31 pages.
P. McKenney, "The new visibility of RCU processing", LWN.net, Oct. 10, 2012, 4 pages.
P. McKenney, "CPU, Hotplug, RCU, and big.LITTLE", Linaro Connect, Nov. 1, 2012, 33 pages.
P. McKenney, Bare-Metal Multicore Performance in a General-Purpose Operating System, Multicore World, Feb. 2013, 66 pages.
P. McKenney, "Simplifying RCU", LWN.net, Mar. 6, 2013.
P. McKenney, "User-space RCU", LWN.net, Nov. 13, 2013, 15 pages.
J. Corbet, "The RCU-tasks subsystem", LWN.net, Jul. 30, 2014.

(56) References Cited

OTHER PUBLICATIONS

P. McKenney, "The RCU API, 2014 Edition", LWN.net, Sep. 4, 2014.

* cited by examiner rcu_nocbs_kthread()
(60)

```
1   static int rcu_nocb_kthread(void *arg)
2   {
3     int c, cl;
4     struct rcu_head *list;
5     struct rcu_head *next;
6     struct rcu_head **tail;
7     struct rcu_data *rdp = arg;
8
9     for (;;) {
10      if (rdp->nocb_leader == rdp)
11        nocb_leader_wait(rdp);
12      else
13        nocb_follower_wait(rdp);
14      list = ACCESS_ONCE(rdp->nocb_follower_head);
15      BUG_ON(!list);
16      trace_rcu_nocb_wake(rdp->rsp->name, rdp->cpu, "WokeNonEmpty");
17      ACCESS_ONCE(rdp->nocb_follower_head) = NULL;
18      tail = xchg(&rdp->nocb_follower_tail, &rdp->nocb_follower_head);
19      c = atomic_long_xchg(&rdp->nocb_follower_count, 0);
20      cl = atomic_long_xchg(&rdp->nocb_follower_count_lazy, 0);
21      rdp->nocb_p_count += c;
22      rdp->nocb_p_count_lazy += cl;
23      trace_rcu_batch_start(rdp->rsp->name, cl, c, -1);
24      c = cl = 0;
25      while (list) {
26        next = list->next;
27        while (next == NULL && &list->next != tail) {
28          trace_rcu_nocb_wake(rdp->rsp->name, rdp->cpu,
29                  TPS("WaitQueue"));
30          schedule_timeout_interruptible(1);
31          trace_rcu_nocb_wake(rdp->rsp->name, rdp->cpu,
32                  TPS("WokeQueue"));
33          next = list->next;
34        }
35        debug_rcu_head_unqueue(list);
36        local_bh_disable();
37        if (__rcu_reclaim(rdp->rsp->name, list))
38          cl++;
39        c++;
40        local_bh_enable();
41        list = next;
42      }
43      trace_rcu_batch_end(rdp->rsp->name, c, !!list, 0, 0, 1);
44      ACCESS_ONCE(rdp->nocb_p_count) -= c;
45      ACCESS_ONCE(rdp->nocb_p_count_lazy) -= cl;
46      rdp->n_nocbs_invoked += c;
47    }
48    return 0;
49  }
```

FIG. 9 nocb_leader_wait()
(62)

```
1   static void nocb_leader_wait(struct rcu_data *my_rdp)
2   {
3     bool firsttime = true;
4     bool gotcbs;
5     struct rcu_data *rdp;
6     struct rcu_head **tail;
7
8   wait_again:
9     if (!rcu_nocb_poll) {
10      trace_rcu_nocb_wake(my_rdp->rsp->name, my_rdp->cpu, "Sleep");
11      wait_event_interruptible(my_rdp->nocb_wq,
12          ACCESS_ONCE(my_rdp->nocb_leader_wake));
13    } else if (firsttime) {
14      firsttime = false;
15      trace_rcu_nocb_wake(my_rdp->rsp->name, my_rdp->cpu, "Poll");
16    }
17    gotcbs = false;
18    for (rdp = my_rdp; rdp; rdp = rdp->nocb_next_follower) {
19      rdp->nocb_gp_head = ACCESS_ONCE(rdp->nocb_head);
20      if (!rdp->nocb_gp_head)
21        continue;
22      ACCESS_ONCE(rdp->nocb_head) = NULL;
23      rdp->nocb_gp_tail = xchg(&rdp->nocb_tail, &rdp->nocb_head);
24      rdp->nocb_gp_count = atomic_xchg(&rdp->nocb_q_count, 0);
25      rdp->nocb_gp_count_lazy =
26        atomic_xchg(&rdp->nocb_q_count_lazy, 0);
27      gotcbs = true;
28    }
29    if (unlikely(!gotcbs)) {
30      if (!rcu_nocb_poll)
31        trace_rcu_nocb_wake(my_rdp->rsp->name, my_rdp->cpu,
32            "WokeEmpty");
33      flush_signals(current);
34      schedule_timeout_interruptible(1);
35      my_rdp->nocb_leader_wake = false;
36      smp_mb();
37      for (rdp = my_rdp; rdp; rdp = rdp->nocb_next_follower)
38        if (ACCESS_ONCE(rdp->nocb_head)) {
39          my_rdp->nocb_leader_wake = true;
40          break;
41        }
42      goto wait_again;
43    }
44    rcu_nocb_wait_gp(my_rdp);
45    my_rdp->nocb_leader_wake = false;
46    smp_mb();
47    for (rdp = my_rdp; rdp; rdp = rdp->nocb_next_follower) {
48      if (ACCESS_ONCE(rdp->nocb_head))
49        my_rdp->nocb_leader_wake = true;
50      if (!rdp->nocb_gp_head)
51        continue;
52      tail = xchg(&rdp->nocb_follower_tail, rdp->nocb_gp_tail);
53      *tail = rdp->nocb_gp_head;
54      atomic_long_add(rdp->nocb_gp_count, &rdp->nocb_follower_count);
55      atomic_long_add(rdp->nocb_gp_count_lazy,
56          &rdp->nocb_follower_count_lazy);
57      if (rdp != my_rdp && tail == &rdp->nocb_follower_head) {
58        wake_up(&rdp->nocb_wq);
59      }
60    }
61    if (!my_rdp->nocb_follower_head)
62      goto wait_again;
63  }
```

FIG. 11

```
                         nocb_follower_wait()
                                 (64)

1   static void nocb_follower_wait(struct rcu_data *rdp)
2   {
3     bool firsttime = true;
4
5     for (;;) {
6       if (!rcu_nocb_poll) {
7         trace_rcu_nocb_wake(rdp->rsp->name, rdp->cpu,
8                 "FollowerSleep");
9         wait_event_interruptible(rdp->nocb_wq,
10             ACCESS_ONCE(rdp->nocb_follower_head));
11      } else if (firsttime) {
12          firsttime = false;
13          trace_rcu_nocb_wake(rdp->rsp->name, rdp->cpu, "Poll");
14      }
15      if (smp_load_acquire(&rdp->nocb_follower_head)) {
16        return;
17      }
18      if (!rcu_nocb_poll)
19        trace_rcu_nocb_wake(rdp->rsp->name, rdp->cpu,
20               "WokeEmpty");
21      flush_signals(current);
22      schedule_timeout_interruptible(1);
23    }
24  }
```

FIG. 13

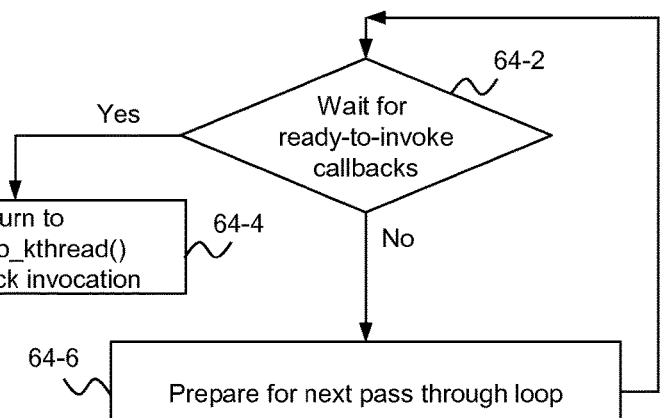

FIG. 14

SCALABLE RCU CALLBACK OFFLOADING

BACKGROUND

1. Field

The present disclosure relates to computer systems and methods in which data resources are shared among data consumers while preserving data integrity and consistency relative to each consumer. More particularly, the disclosure concerns a mutual exclusion mechanism known as "read-copy update."

2. Description of the Prior Art

By way of background, read-copy update (also known as "RCU") is a mutual exclusion technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The technique is well suited to both uniprocessor and multiprocessor computing environments wherein the number of read operations (readers) accessing a shared data set is large in comparison to the number of update operations (updaters), and wherein the overhead cost of employing other mutual exclusion techniques (such as locks) for each read operation would be high. By way of example, a network routing table that is updated at most once every few minutes but searched many thousands of times per second is a case where read-side lock acquisition would be quite burdensome.

The read-copy update technique implements data updates in two phases. In the first (initial update) phase, the actual data update is carried out in a manner that temporarily preserves two views of the data being updated. One view is the old (pre-update) data state that is maintained for the benefit of read operations that may have been referencing the data concurrently with the update. The other view is the new (post-update) data state that is seen by operations that access the data following the update. In the second (deferred update) phase, the old data state is removed following a "grace period" that is long enough to ensure that the first group of read operations will no longer maintain references to the pre-update data. The second-phase update operation typically comprises freeing a stale data element to reclaim its memory. In certain RCU implementations, the second-phase update operation may comprise something else, such as changing an operational state according to the first-phase update.

FIGS. 1A-1D illustrate the use of read-copy update to modify a data element B in a group of data elements A, B and C. The data elements A, B, and C are arranged in a singly-linked list that is traversed in acyclic fashion, with each element containing a pointer to a next element in the list (or a NULL pointer for the last element) in addition to storing some item of data. A global pointer (not shown) is assumed to point to data element A, the first member of the list. Persons skilled in the art will appreciate that the data elements A, B and C can be implemented using any of a variety of conventional programming constructs, including but not limited to, data structures defined by C-language "struct" variables. Moreover, the list itself is a type of data structure.

It is assumed that the data element list of FIGS. 1A-1D is traversed (without locking) by multiple readers and occasionally updated by updaters that delete, insert or modify data elements in the list. In FIG. 1A, the data element B is being referenced by a reader r1, as shown by the vertical arrow below the data element. In FIG. 1B, an updater u1 wishes to update the linked list by modifying data element B. Instead of simply updating this data element without regard to the fact that r1 is referencing it (which might crash r1), u1 preserves B while generating an updated version thereof (shown in FIG. 1C as data element B') and inserting it into the linked list. This is done by u1 acquiring an appropriate lock (to exclude other updaters), allocating new memory for B', copying the contents of B to B', modifying B' as needed, updating the pointer from A to B so that it points to B', and releasing the lock. In current versions of the Linux® kernel, pointer updates performed by updaters can be implemented using the rcu_assign_pointer( ) primitive. As an alternative to locking during the update operation, other techniques such as non-blocking synchronization or a designated update thread could be used to serialize data updates. All subsequent (post update) readers that traverse the linked list, such as the reader r2, will see the effect of the update operation by encountering B' as they dereference B's pointer. On the other hand, the old reader r1 will be unaffected because the original version of B and its pointer to C are retained. Although r1 will now be reading stale data, there are many cases where this can be tolerated, such as when data elements track the state of components external to the computer system (e.g., network connectivity) and must tolerate old data because of communication delays. In current versions of the Linux® kernel, pointer dereferences performed by readers can be implemented using the rcu_dereference( ) primitive.

At some subsequent time following the update, r1 will have continued its traversal of the linked list and moved its reference off of B. In addition, there will be a time at which no other reader task is entitled to access B. It is at this point, representing an expiration of the grace period referred to above, that u1 can free B, as shown in FIG. 1D.

FIGS. 2A-2C illustrate the use of read-copy update to delete a data element B in a singly-linked list of data elements A, B and C. As shown in FIG. 2A, a reader r1 is assumed be currently referencing B and an updater u1 wishes to delete B. As shown in FIG. 2B, the updater u1 updates the pointer from A to B so that A now points to C. In this way, r1 is not disturbed but a subsequent reader r2 sees the effect of the deletion. As shown in FIG. 2C, r1 will subsequently move its reference off of B, allowing B to be freed following the expiration of a grace period.

In the context of the read-copy update mechanism, a grace period represents the point at which all running tasks (e.g., processes, threads or other work) having access to a data element guarded by read-copy update have passed through a "quiescent state" in which they can no longer maintain references to the data element, assert locks thereon, or make any assumptions about data element state. By convention, for operating system kernel code paths, a context switch, an idle loop, and user mode execution all represent quiescent states for any given CPU running non-preemptible code (as can other operations that will not be listed here). The reason for this is that a non-preemptible kernel will always complete a particular operation (e.g., servicing a system call while running in process context) prior to a context switch.

In FIG. 3, four tasks 0, 1, 2, and 3 running on four separate CPUs are shown to pass periodically through quiescent states (represented by the vertical bars). The grace period (shown by the dotted vertical lines) encompasses the time frame in which all four tasks that began before the start of the grace period have passed through one quiescent state. If the four tasks 0, 1, 2, and 3 were reader tasks traversing the linked lists of FIGS. 1A-1D or FIGS. 2A-2C, none of these tasks having reference to the old data element B prior to the grace period could maintain a reference thereto following the grace period. All post grace period searches conducted by these tasks would bypass B by following the updated pointers created by the updater.

Grace periods may synchronous or asynchronous. According to the synchronous technique, an updater performs the first phase update operation, invokes a function such as synchronize_rcu( ) to await a grace period, then blocks (waits) until a grace period has completed, and then implements the second phase update operation, such as by removing stale data. According to the asynchronous technique, an updater performs the first phase update operation, specifies the second phase update operation as a callback, invokes a function such as call_rcu( ) to await a grace period and invoke callback processing, then resumes with the knowledge that the callback will eventually be processed at the end of the grace period. Advantageously, callbacks requested by one or more updaters can be batched (e.g., on callback lists) and processed as a group at the end of an asynchronous grace period. This allows asynchronous grace period overhead to be amortized over plural deferred update operations.

In current versions of the mainline Linux® kernel, RCU has been adapted to accommodate Real-time and HPC (High Performance Computing) workloads running in user space. Such RCU implementations support the offloading of RCU callbacks from CPUs that run such workloads, with the offloaded callbacks being processed by a kernel thread (e.g., a Linux® kthread) running on another CPU. Currently, the Linux® "CONFIG_RCU_NOCB_CPU=Y" compile parameter activates this functionality. A boot parameter may be used to specify which CPUs are No-Callbacks (No-CBs) CPUS. The kthreads that process offloaded RCU callbacks are named "rcuoxN" where "x" is the RCU flavor ("b" for RCU-bh, "p" for RCU-preempt, and "s" for RCU-sched), and "N" is number of the No-CBs CPU whose callbacks are handled by a given kthread.

The real-time and HPC workloads for which RCU callback offloading was initially designed execute primarily in user space, and thus produce few RCU callbacks. For these workloads, the scalability of the RCU callback offload mechanism has been largely irrelevant. However, a number of Linux® distributions have begun enabling the RCU callback offloading mechanism by default, which means that this mechanism must now handle general workloads, including those workloads that make heavy use of RCU on large systems. Scalability is therefore now critically important.

Unfortunately, measurements have shown that an 80-CPU system has between 30-40% CPU utilization on the RCU grace-period kthread that performs various RCU grace period operations. Extrapolating to a 256-CPU system would result in this kthread consuming an entire CPU, so that RCU would be unable to keep up with RCU grace period requests on larger systems. Further investigation has revealed that the bottleneck is due to the fact that the RCU grace-period kthread must wake up the RCU callback-offload kthreads.

It would therefore be desirable to provide a more scalable wakeup method for waking kthreads that are responsible for invoking offloaded RCU callbacks.

SUMMARY

A method, system and computer program product are provided for scaling Read-Copy Update (RCU) callback offloading. In an example embodiment, a set of CPUs in a computer system may be designated as no-callbacks (No-CBs) CPUs that do not perform RCU callback processing. A set of RCU callback offload kernel threads (rcuo kthreads) may be spawned and each may be assigned to one of the No-CBs CPUs to invoke RCU callbacks generated by workloads running on the No-CBs CPUs at CPUs that are not No-CBs CPUs. Groups of the rcuo kthreads may be established, with each rcuo kthread group having one leader kthread and one or more follower rcuo kthreads. The leader rcuo kthreads may be periodically awakened without waking up the follower kthreads when an RCU grace period ends and an RCU callback needs to be invoked, or when a new RCU callback arrives and a new RCU grace period needs to be started. The leader rcuo kthreads may periodically awaken their associated follower rcuo kthreads for which the leader rcuo kthreads have sole responsibility to wake.

BRIEF DESCRIPTION OF THE DRAWINGS

The foregoing and other features and advantages will be apparent from the following more particular description of example embodiments, as illustrated in the accompanying Drawings.

FIG. 9 is a diagram showing an example source code listing for an rcu_nocbs_kthreads( ) function that may be implemented by rcuo kthreads.

FIG. 11 is a diagram showing an example source code listing for an nocb_leader_wait( ) function that may be implemented by leader rcuo kthreads.

FIG. 13 is a diagram showing an example source code listing for an nocb_follower_wait( ) function that may be implemented by follower rcuo kthreads.

FIG. 14 is a flow diagram showing example operations performed by the nocb_follower_wait( ) function of FIG. 13.

DETAILED DESCRIPTION OF EXAMPLE EMBODIMENTS

Figure 1A:
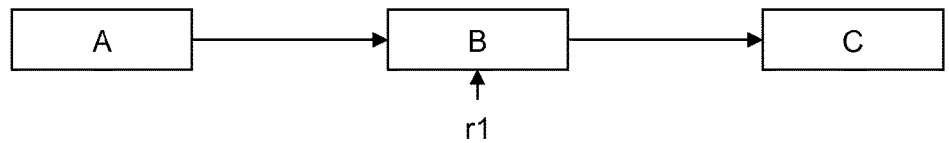
FIGS. 1A-1D are diagrammatic representations of a linked list of data elements undergoing a data element replacement according to a conventional read-copy update mechanism.
Figure 1B:
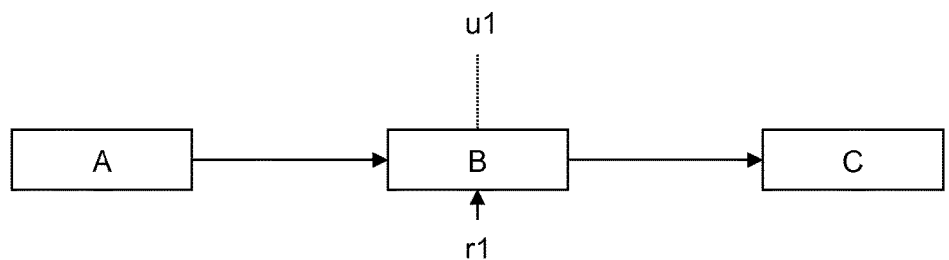
Figure 1C:
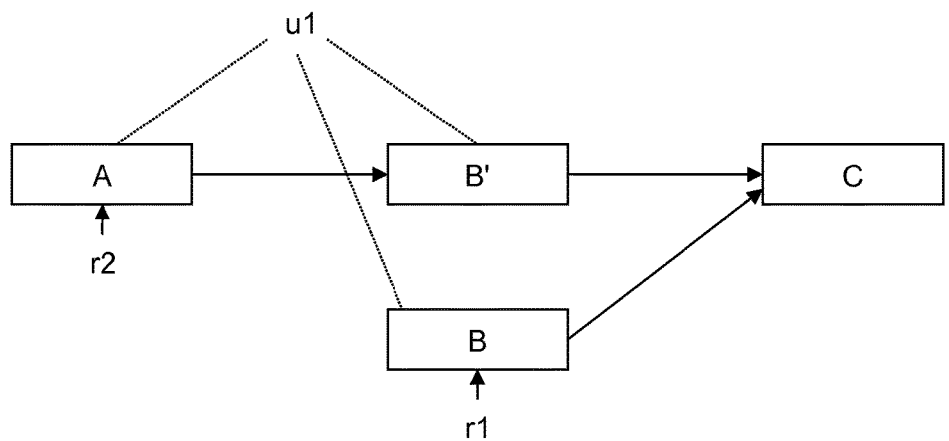
Figure 1D:
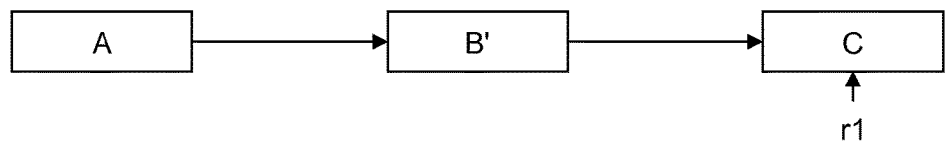
Figure 2A:
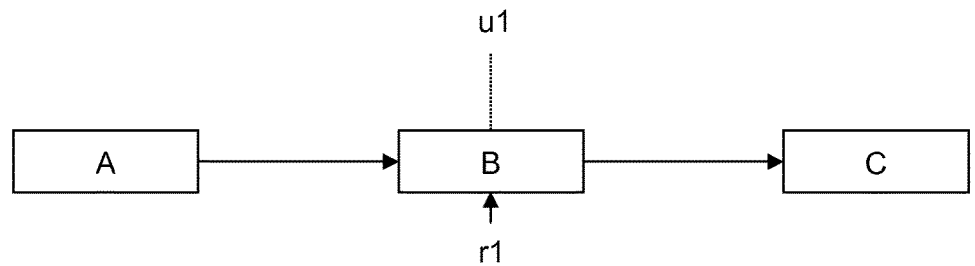
FIGS. 2A-2C are diagrammatic representations of a linked list of data elements undergoing a data element deletion according to a conventional read-copy update mechanism.
Figure 2B:
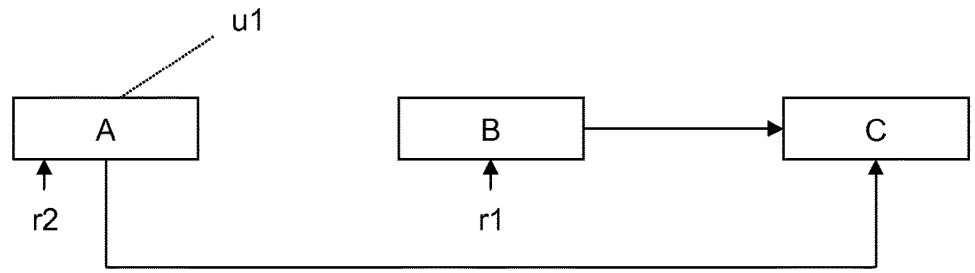
Figure 2C:
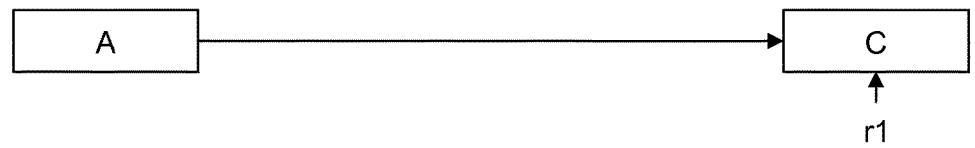
Figure 3:
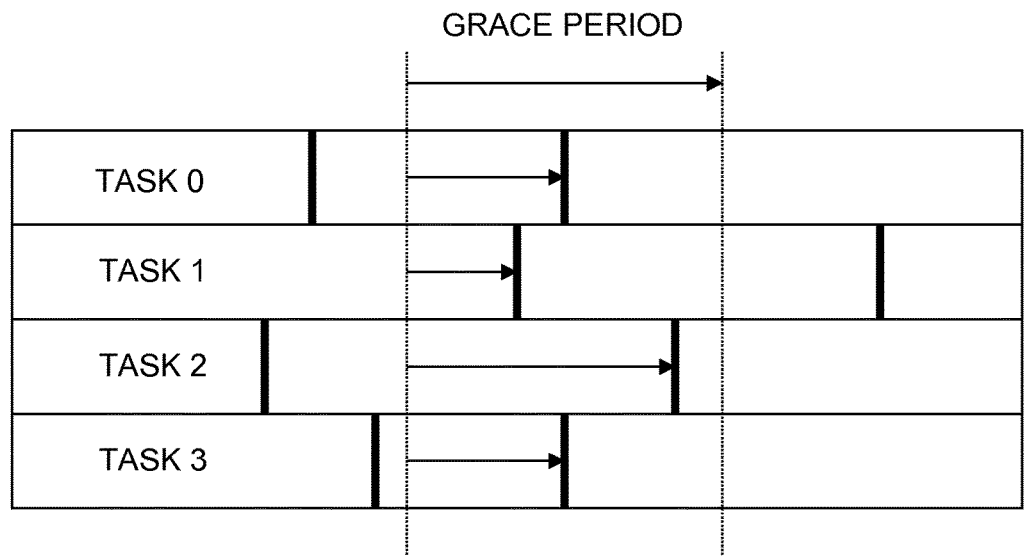
FIG. 3 is a flow diagram illustrating a prior art representation of a grace period in which four processes pass through a quiescent state.
Figure 4:
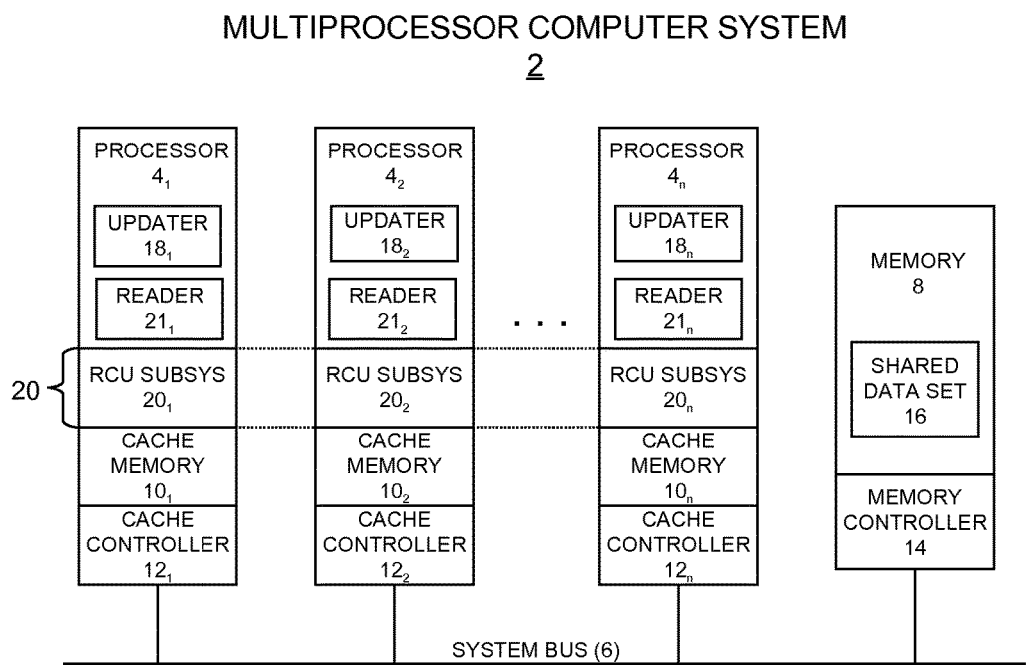
FIG. 4 is a functional block diagram showing a multiprocessor computing system.

Turning now to the figures, wherein like reference numerals represent like elements in all of the several views, FIG. 4 illustrates an example multiprocessor computer system in which the hierarchical RCU grace period detection technique described herein may be implemented. In FIG. 4, a computer system 2 includes a plurality of processors $4_1$, $4_2 \ldots 4_n$, a system bus 6, and a program memory 8. There are also cache memories $10_1$, $10_2 \ldots 10_n$ and cache controllers $12_1$, $12_2 \ldots 12_n$ respectively associated with the processors $4_1$, $4_2 \ldots 4_n$. A memory controller 14 is associated with the memory 8. As shown, the memory controller 14 may reside separately from processors $4_2 \ldots 4_n$ (e.g., as part of a chipset). As discussed below, it could also comprise plural memory controller instances residing on the processors $4_1$, $4_2 \ldots 4_n$.

The computer system 2 may represent any of several different types of computing apparatus. Such computing apparatus may include, but are not limited to, general purpose computers, special purpose computers, portable computing devices, communication and/or media player devices, set-top devices, embedded systems, and other types of information handling machines. The term "processor" as used with reference to the processors $4_1$, $4_2 \ldots 4_n$ encompasses any program execution unit capable of executing program instructions, including but not limited to a packaged integrated circuit device (such as a microprocessor), a processing core within a packaged integrated circuit device (such as a microprocessor core), or a hardware thread comprising one or more functional units within a processing core (such as an SMT thread). Each such execution unit may also be referred to as a CPU (central processing unit). The processors $4_1$, $4_2 \ldots 4_n$ may be situated within a single computing device or node (e.g., as part of a single-node SMP system) or they may be distributed over plural nodes (e.g., as part of a NUMA system, a cluster, or a cloud). The memory 8 may comprise any type of tangible storage medium capable of storing data in computer readable form for use in program execution, including but not limited to, any of various types of random access memory (RAM), various flavors of programmable read-only memory (PROM) (such as flash memory), and other types of primary storage (i.e., program memory). The cache memories $10_1$, $10_2 \ldots 10_n$ may be implemented in several levels (e.g., as level 1, level 2 and level 3 caches) and the cache controllers $12_1$, $12_2 \ldots 12_n$ may collectively represent the cache controller logic that supports each cache level. As illustrated, the memory controller 14 may reside separately from processors $4_1$, $4_2 \ldots 4_n$, for example, as part of a discrete chipset. Alternatively, as previously mentioned, the memory controller 14 could be provided by plural memory controller instances that are respectively integrated with the processors $4_1$, $4_2 \ldots 4_n$.

Figure 5:
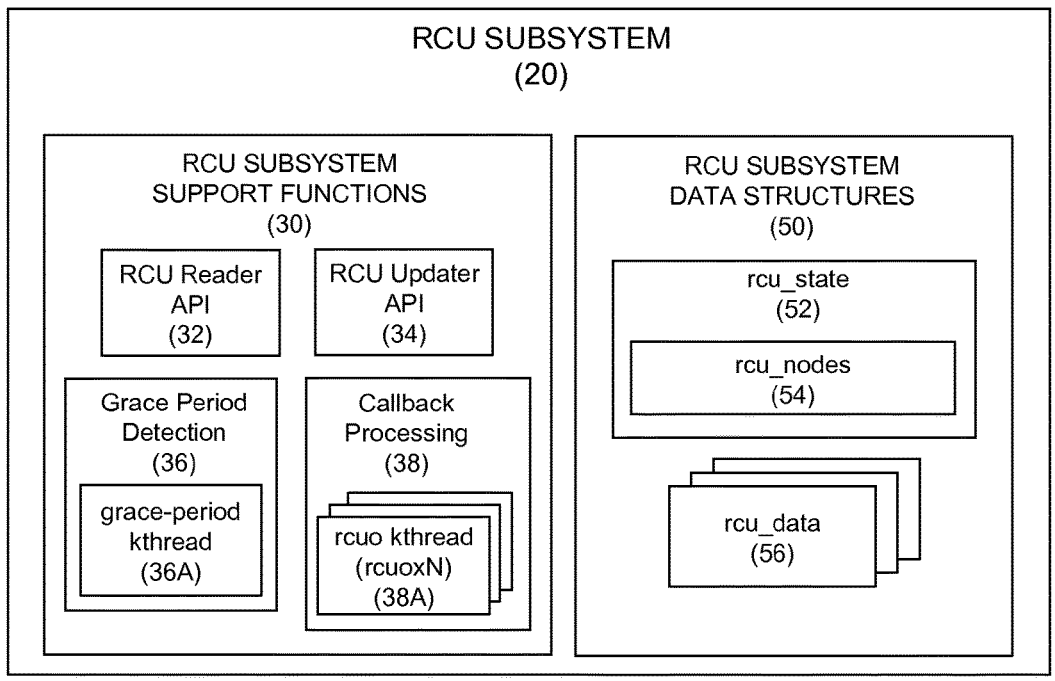
FIG. 5 is a functional block diagram showing an example RCU subsystem that may be provided in the computer system of FIG. 4.

Each CPU embodied by a given processor 4 is operable to execute program instruction logic under the control of a software program stored in the memory 8 (or elsewhere). As part of this program execution logic, update operations (updaters) 18 may execute within a process, thread, or other execution context (hereinafter "task") on any of the processors 4. Each updater 18 runs periodically to perform updates on a set of shared data 16 that may be stored in the shared memory 8 (or elsewhere). In FIG. 4, reference numerals $18_1$, $18_2 \ldots 18_n$ illustrate individual data updaters that respectively execute on the several processors $4_1$, $4_2 \ldots 4_n$. As described in the "Background" section above, the updates performed by an RCU updater can include modifying elements of a linked list, inserting new elements into the list, deleting elements from the list, and other types of operations. To facilitate such updates, the processors 4 may be programmed from instructions stored in the memory 8 (or elsewhere) to implement a read-copy update (RCU) subsystem 20 as part of their processor functions. In FIG. 5, reference numbers $20_1$, $20_2 \ldots 20_n$ represent individual RCU instances that may respectively periodically execute on the several processors $4_1$, $4_2 \ldots 4_n$.

Any given processor 4 may also periodically execute a read operation (reader) 21. Each reader 21 runs from program instructions stored in the memory 8 (or elsewhere) in order to periodically perform read operations on the set of shared data 16 stored in the shared memory 8 (or elsewhere). In FIG. 5, reference numerals $21_1$, $21_2 \ldots 21_n$ illustrate individual reader instances that may respectively execute on the several processors $4_1$, $4_2 \ldots 4_n$. Such read operations will typically be performed far more often than updates, this being one of the premises underlying the use of read-copy update. Moreover, it is possible for several of the readers 21 to maintain simultaneous references to one of the shared data elements 16 while an updater 18 updates the same data element.

During operation of the computer system 2, an updater 18 will occasionally perform an update to one of the shared data elements 16. In accordance with the philosophy of RCU, a first-phase update may be performed in a manner that temporarily preserves a pre-update view of the shared data element for the benefit of readers 21 that may be concurrently referencing the shared data element during the update operation. Following the first-phase update, the updater 18 may post a callback to invoke the RCU subsystem 20 that results in the deferred destruction of the pre-update view of the data (second-phase update) following an RCU grace period. The grace period processing performed by the RCU subsystem 20 entails starting new grace periods and detecting the end of old grace periods so that the RCU subsystem 20 knows when it is safe to free stale data (or take other actions).

Turning now to FIG. 5, example support function components 30 of the RCU subsystem 20 are shown. Among these components is a set of RCU subsystem support functions 30, namely, an RCU reader API (Application Programming Interface) 32, an RCU updater API 34, and a set of RCU grace period detection functions 36 and a set of RCU callback processing functions 38.

The RCU reader API 32 may comprise a reader registration component and a reader unregistration component that are respectively invoked by readers 21 as they enter and leave their RCU read-side critical sections to read shared data 16. This allows the RCU subsystem 20 to track reader operations and determine when readers are engaged in RCU-protected read-side critical section processing. In an example embodiment, the reader registration and unregistration components may be respectively implemented using the rcu_read_lock( ) and rcu_read_unlock( ) primitives found in existing read-copy update implementations.

The RCU updater API 34 may comprise synchronization primitives such as synchronize_rcu( ) and call_rcu( ) for use by updaters 18 to defer the removal of shared data 16 that may be referenced by the readers 21 until the grace period detection component 36 determines that a grace period has elapsed.

The grace period detection component 36 includes a grace-period kthread 36A that handles various RCU grace period operations, such as grace-period initialization, quiescent-state forcing, and grace-period cleanup. The callback processing component 38 spawns a set of rcuo kthreads 38A that process callbacks at the end of grace periods on behalf of CPUs 4 in the computer system 2 that have been designated as No-CBs (no callbacks) CPUs. Each rcuo kthread 38A is assigned to one of the No-CBs CPUs, but runs on a different CPU that is not a No-CBs CPU. The rcuo kthreads 38A offload the callback invocation work of the No-CBs CPUs to the non-No-CBs CPUs, which improves the performance of HPC and real-time workloads that may run on the No-CBs CPUs. As described in the "Background" section above, the rcuo kthreads 38A may be designated using the nomenclature "rcuoxN" where "x" is the RCU flavor ("b" for RCU-bh, "p" for RCU-preempt, and "s" for RCU-sched), and "N" is number of the No-CBs CPU whose callbacks are handled by a given kthread.

With continuing reference now to FIG. 5, the RCU subsystem 20 further includes a set of RCU subsystem data structures 50. These data structures may include an rcu_state structure 52 having embedded therein (e.g., as a linear array) a combining tree of rcu_node structures 54. The RCU subsystem 20 may thus support hierarchical grace period detection. The tree of rcu_node structures tracks quiescent states using bitmasks (not shown) that respectively indicate which CPU's quiescent states are still required in order to end current and future grace periods. Each leaf rcu_node structure 54 has a set of a per-processor rcu_data structures 56 assigned to it, with each rcu_data structure representing one CPU in the computer system 2.

Figure 6A:
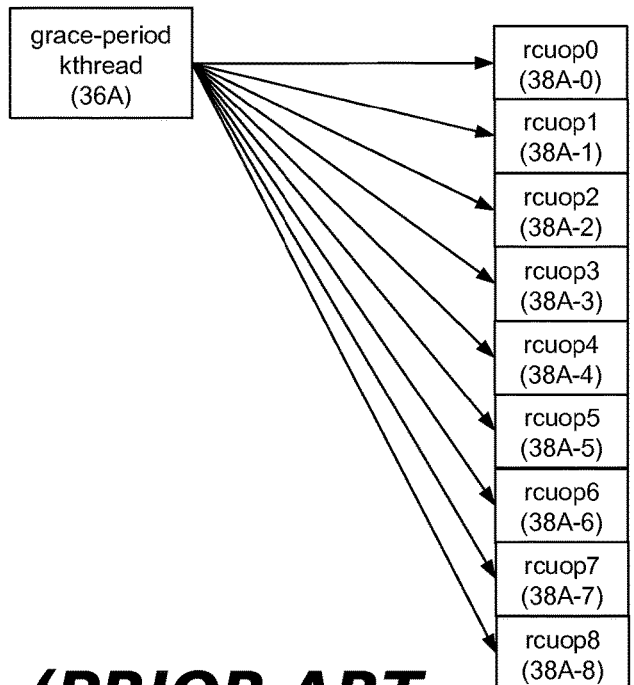
FIG. 6A is a functional block diagram showing a prior art technique for waking up rcuo kthreads.

The rcuo kthreads 38A are periodically awakened by the grace-period kthread 36A at the end of grace periods when an RCU callback needs to be invoked. They are also awakened when a new RCU callback is registered to them (e.g., via the call_rcu( ) function) and a new grace period is needed. As the number of No-CBs CPUs rises, the number of rcuo kthreads 38A also rises, which in turn increases the amount of wakeup work that the grace-period kthread 36A must do at the end of each grace period. A relatively modest 80-CPU system running an RCU-update-heavy workload will have a grace-period kthread 36A that consumes a substantial fraction of a CPU, so larger systems can be expected to suffer large degradations of grace-period latency. This situation is illustrated in FIG. 6A, which shows the grace-period kthread 36A waking up nine rcuo kthreads 38A-0 through 38A-8. By way of example only, these rcuo kthreads have been designated as rcuop0 through rcuop8, meaning that they are associated with the RCU flavor known as RCU_preempt. Different designations may be used for other RCU flavors, as discussed above.

Figure 6B:
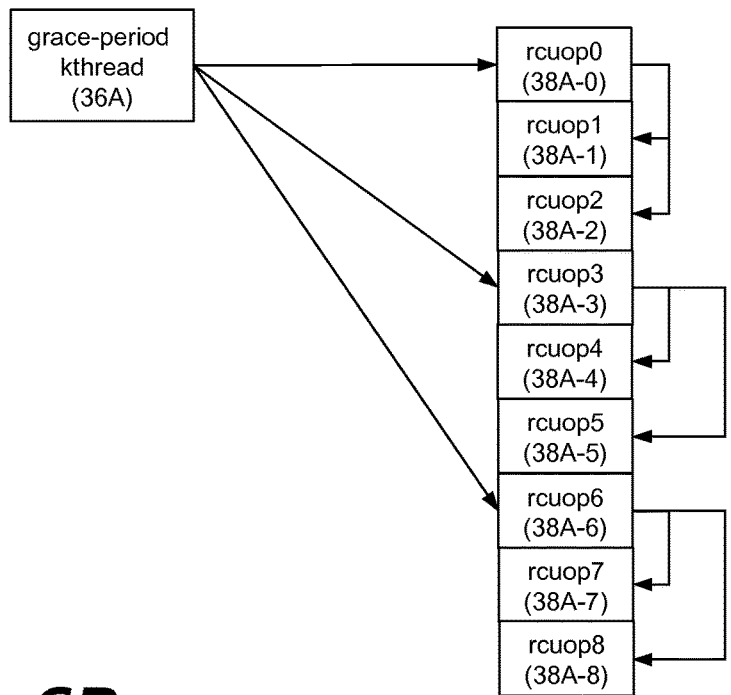
FIG. 6B is a functional block diagram showing a proposed technique for waking up rcuo kthreads.

A general approach that may be used to address the foregoing scalability issue is to create a wakeup hierarchy as exemplified by FIG. 6B. Here, the grace-period kthread 36A awakens only the rcuop0, rcuop3, and rcuop6 kthreads. Similarly, any variants of the RCU call_rcu( ) function that previously woke up each rcuo kthread 38A will also awaken only the rcuop0, rcuop3, and rcuop6 kthreads. Each of these "leader" rcuo kthreads then awakens the two other "follower" rcuo kthreads in its "group." For example, rcuop0 awakens rcuop1 and rcuop2. By default, the groups may be sized by taking the square root of the total number of CPUs 4 in the system 2, so that the nine-CPU example in FIG. 6B has three groups with three rcuo kthreads each (one leader and two followers). Similarly, in a four-CPU version of the system 2 there would be two groups with two rcuo kthreads each (one leader and one follower). In a sixteen-CPU example there would be four groups with four rcuo kthreads each (one leader and three followers), and so on. If the number of CPUs 4 in the system 2 happens not to be a perfect square, rounding may be used. An example embodiment rounds down, thus choosing to reduce the load on the grace-period kthread 36A in favor of increasing it slightly for each of the rcuo kthreads 38A.

Any of a number of other methods could be used to size the groups, and multiple-level wakeup trees are also possible. For example, in FIG. 6B, the grace-period kthread 36A awakens three rcuo kthreads 38A-0 (rcuop0), 38A-3 (rcuop3) and 38A-6 (rcuop6), but each of these leader rcuo kthreads awakens only two other follower rcuo kthreads. If it was important to have each leader rcuo kthread 38A awaken the same number of follower rcuo kthreads as did the grace-period kthread 36A, the fanout could be determined by solving equation (1) below:

$$m(m+1)=N, \text{ where "}m\text{" is the number of leader rcuo kthreads, and "}N\text{" is the number of CPUs.} \quad (1)$$

This quadratic equation has the solution shown in equation (2) below:

$$m=[(4N+1)^{1/2}-1]/2 \quad (2)$$

Thus, if there were 12 CPUs in the system (N=12), solving for m would give three groups having four rcuo kthreads 38A apiece, namely, one leader rcuo kthread and three follower rcuo kthreads. It will be seen that the number of leader rcuo kthreads 38A awoken by the grace-period kthread 36A matches the number of follower rcuo kthreads awoken by each leader, namely, three.

A large system might have additional levels of hierarchy, so that a 4,096-CPU system might have 16 top-level leader rcuo kthreads 38A that are awakened by the grace-period kthread 36A, and each of those leader rcuo kthreads might awaken 15 "mid-level" follower rcuo kthreads, who would in turn awaken 15 "leaf-level" follower rcuo kthreads. In this case, the size of the groups is given by the cube root of the number of CPUs. As was the case in FIG. 6B, the RCU grace-period kthread 36A awakens one more rcuo kthread 38A than the leader and mid-level rcuo kthreads. This situation can be avoided by solving the cubic equation (3) below:

$$m^3+2m^2+m-N=0 \quad (3)$$

Given that the cube root will be off by at most one, there may be little point in solving equation (3). Similarly, the solution to equation (2) will differ from the square root by at most one, such that it is still substantially the square root. Thus, an example embodiment uses square root. This is convenient due to the fact that the modern operating systems typically have a square-root function, such as the function named "int_sqrt( )" in the Linux® kernel.

Another approach includes leveraging the rcu_node hierarchy of the rcu_state structure 52 (which requires additional rcuo kthreads 38A), using a linear chain. In that case, each rcuo kthread 38A awakens the next, so this may have excessive wakeup latency on large systems (e.g., multiple milliseconds on 4096-CPU systems). In contrast, the square-root approach would result in a chain of at most 64 wakeups on a 4096-CPU system. It is also easy to compute and does not require any additional rcuo kthreads 38A.

In addition to propagating wakeups to the rcuo kthreads 38A, it is also necessary to process their assigned RCU callbacks. One legitimate approach would be to have the leaders wake up any followers that have RCU callbacks queued, and let the followers each wait for a grace period and then process their own callbacks. However, this approach has two disadvantages:

1. If each follower rcuo kthread 38A waits separately for a grace period, there will likely be at least two grace periods before its RCU callbacks are processed;

2. If each follower rcuo kthread 38A waits separately for a grace period, then each such rcuo kthread might be awakened twice: once for the end of the previous grace period, and again when another RCU callback is registered (e.g., via the call_rcu( ) function).

Another approach is to have the leaders be awakened when new callbacks arrive, have each leader snapshot its followers' lists of callbacks, wait for a grace period, then awaken its followers. Although the multiple leaders might still cause multiple grace period computations, the smaller number of leaders means a correspondingly smaller number of grace periods. More importantly, the followers, which for large systems far outnumber the leaders, are awakened only once per grace period rather than twice. This approach is used in the example embodiment now to be described.

Figure 7:
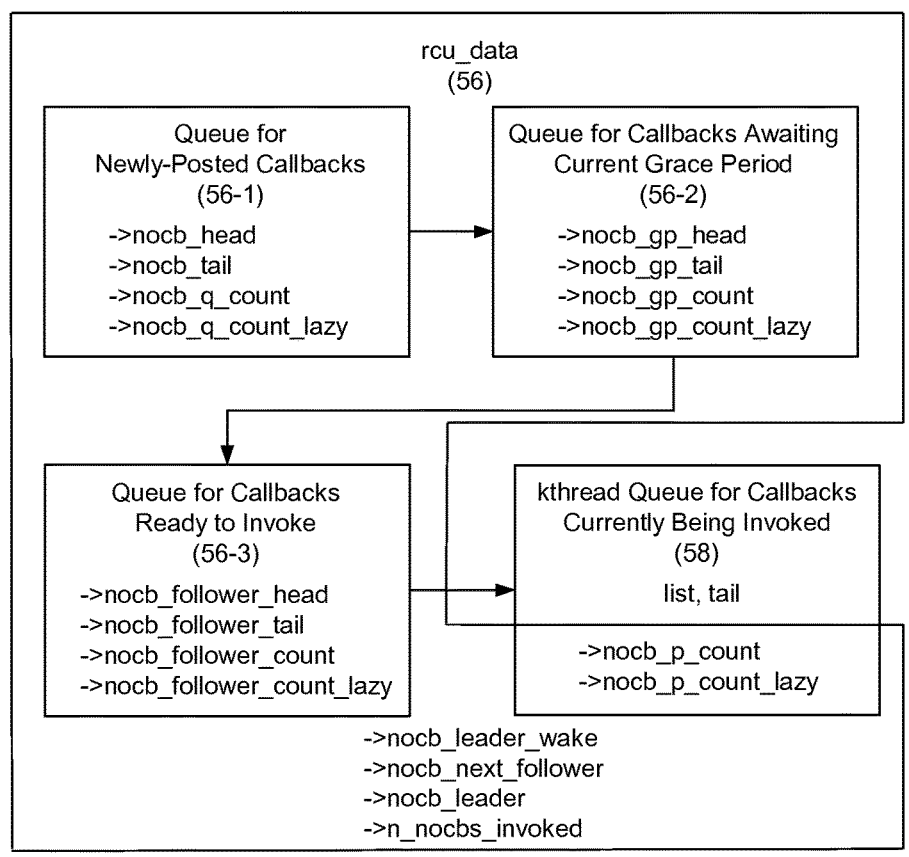
FIG. 7 is a functional block diagram showing fields of an example rcu_data structure that may be implemented by the RCU subsystem of FIG. 5.

Turning now to FIG. 7, an example embodiment of the hierarchical wakeup tree disclosed herein may be implemented by defining several callback queues (56-1, 56-2 and 56-3) in each rcu_data structure 56 that are used for queuing RCU callbacks to be processed at different times. As described in the next paragraph, each queue 56-1, 56-2 and 56-3 may be defined by a group of four fields. There is also a callback queue 58 for each rcuo kthread 38A. The queue 58 may be defined by two fields of the rcu_data structure 56 and two local variables associated with the top-level function run by the rcu_data structure's associated rcuo kthread 38A. The arrows in FIG. 7 show the progression of RCU callbacks as they advance through the various queues 56-1, 56-2, 56-3 and 58.

The first callback queue 56-1 of the rcu_data structure may be referred to as a "callbacks-new" queue. This queue is defined by four fields that act together as a single queue containing new RCU callbacks registered by call_rcu( ) (and similar functions), but not yet processed in any way. The first field→nocb_head is a pointer to the head of the queue, and the second field→nocb_tail is a pointer to the tail of the queue. The nocb_q_count and nocb_q_count_lazy fields respectively maintain a count of callbacks and lazy callbacks on the queue. As is known, callbacks in the "lazy" category may be delayed for long periods of time, for example, up to six seconds for RCU implementations in the Linux® kernel.

The second callback queue 56-2 of the rcu_data structure 56 may be referred to as a "callbacks-wait" queue. This queue is defined by four fields that act together as a single queue containing the RCU callbacks that are waiting for the current grace period to end. The first field called→nocb_g-p_head is a pointer to the head of the queue, and the second field→nocb_gp_tail is a pointer to the tail of the queue. The nocb_gp_count and nocb_gp_count_lazy fields respectively track the count of callbacks and lazy callbacks on the queue.

The third callback queue 56-3 of the rcu_data structure 56 may be referred to as a "callbacks-ready" queue. This queue is defined by four fields that act together as a single queue containing the RCU callbacks whose grace period has completed and are ready to be invoked, but whose invocation has not yet been started by associated rcuo kthread. The first field called→nocb_follower_head is a pointer to the head of the queue, and the second field→nocb_follower_tail is a pointer to the tail of the queue. The nocb_follower_count and nocb_follower_count_lazy fields respectively track the count of callbacks and lazy callbacks on the queue.

The fourth callback queue 58 is for the RCU callbacks may be referred to as a "callbacks-invoke" queue. This queue is for callbacks that are currently being invoked by the rcu_data structure's associated rcuo kthread 38A. The queue 58 is defined by two fields of the rcu_data structure 56 and two local variables associated with the top-level callback processing function run by the rcuo kthread 38A. The two local variables are a head queue head pointer called "list" and a queue tail pointer called "tail." The two rcu_data structure fields are→nocb_p_count and→nocb_p_count_lazy, which respectively track the count of callbacks and lazy callbacks on the queue.

Four additional fields of the rcu_data structure 56 are shown at the bottom of FIG. 7. The first such field is a flag called→nocb_leader_wake that is used to control wakeups sent to leader rcuo kthreads. The second field is a pointer called→nocb_next_follower that references the rcu_data structure 56 associated with the next follower rcuo kthread in the current rcuo kthread group. This is the NULL pointer for the rcu_data structure 56 associated with last rcuo kthread follower in the group. The third field is a pointer called→nocb_leader that references the rcu_data structure 56 associated with the leader rcuo kthread in the current rcuo kthread group. Note that in the present embodiment, a leader rcuo kthread may be considered to be a follower of itself. In that case, the →nocb_leader pointer will be self-referential. The fourth field is a counter called→n_nocbs_invoked that tracks the total number of callbacks invoked for this rcu_data structure 56 since boot.

Figure 8:
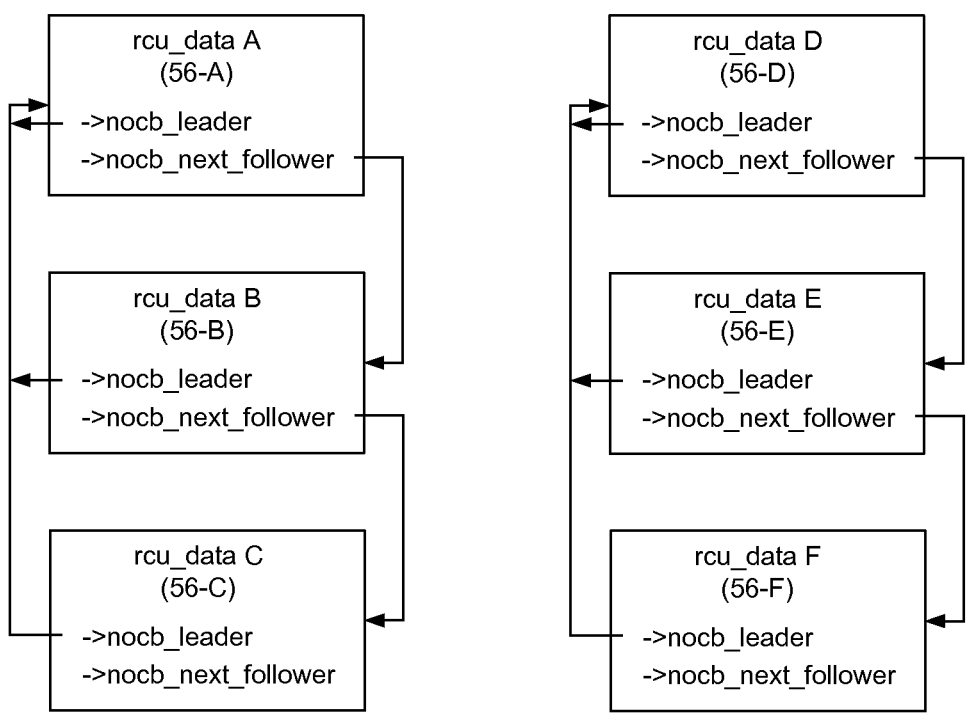
FIG. 8 is a functional block diagram showing an example relationship between rcu_data structures corresponding to leader and follower rcuo kthreads.

FIG. 8 illustrates sets of rcu_data structures 56 linked into leader-follower groups corresponding to the rcuo kthread groups of their associated rcuo kthreads 38A. Here, rcu_data structure 56-A (rcu_data A) leads a first group consisting of itself and rcu_data structures 56-B (rcu_data B) and 56-C (rcu_data C). Similarly, rcu_data structure 56-D (rcu_data D) leads the second group consisting of itself and rcu_data structures 56E (rcu_data E) and 56-F (rcu_data F).

Figure 10:
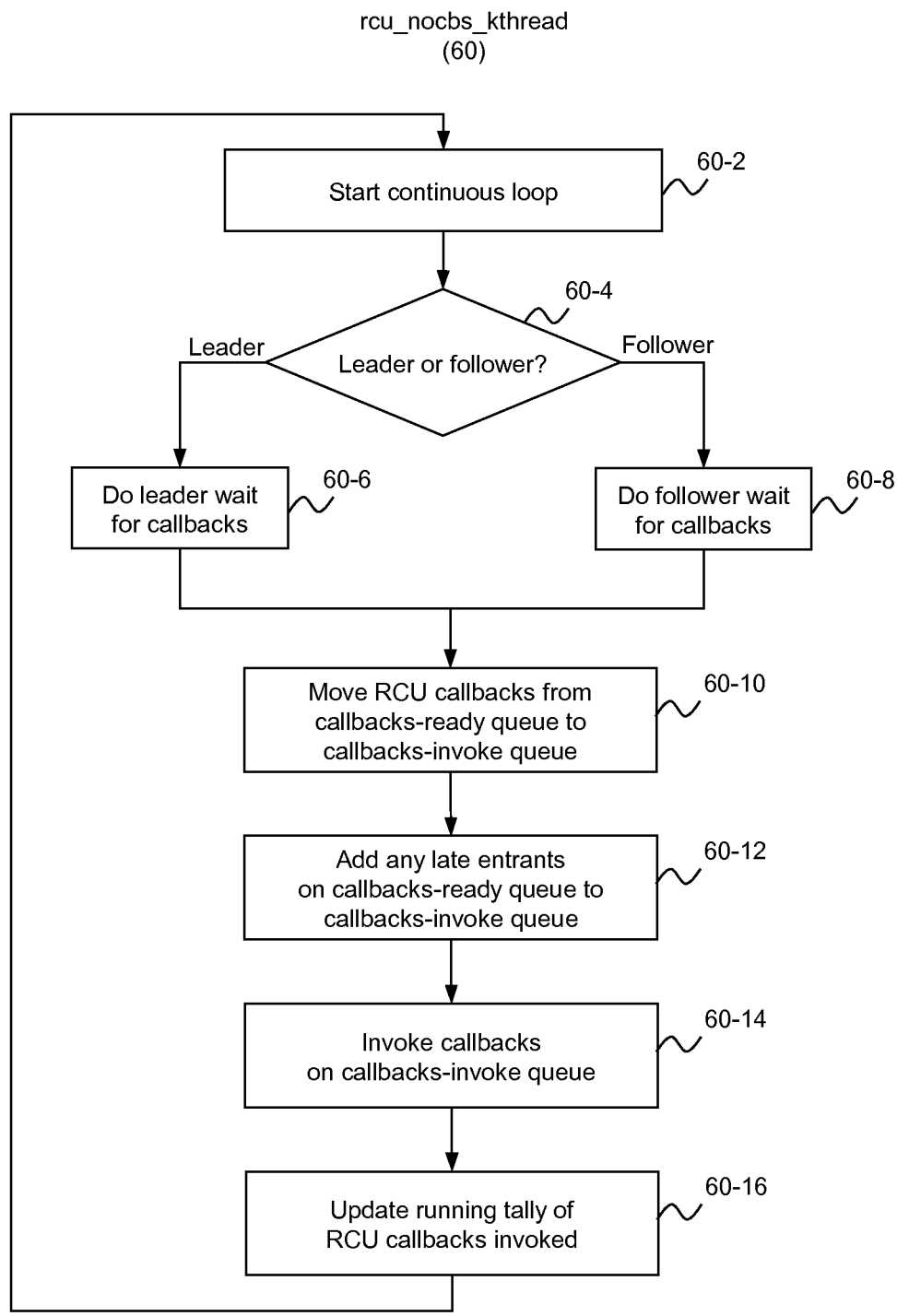
FIG. 10 is a flow diagram showing example operations performed by the rcu_nocbs_kthreads( ) function of FIG. 9.

FIG. 9 illustrates example C-language source code that may be used to implement the callback invocation operations of the rcuo kthreads 38A. FIG. 10 is a corresponding flow diagram. The source code of FIG. 9 defines a function 60 that may be called rcu_nocb_kthread( ). The rcu_nocb_kthread( ) function 60 is the kthread_run( ) spawned top-level function for the rcuo kthreads 38A. It implements a large for loop spanning lines 9-47, with each pass through the loop invoking a batch of RCU callbacks. Block 60-2 of FIG. 10 illustrates the start of this loop. As previously noted, each rcuo kthread 38A is associated with a particular rcu_data structure 56. The address of this rcu_data structure 56 is passed to the rcu_nocb_kthread( ) function through the sole function argument named "arg."

Line 10 of the code checks to see if this rcu_data structure 38A is a leader, and if so line 11 invokes a function called nocb_leader_wait( ), and otherwise line 13 invokes a function called "nocb_follower_wait( )," in both cases to wait for RCU callbacks that are to be invoked by this rcuo kthread. These callbacks will be on the callbacks-ready queue 56-3 of FIG. 7 that consists of the rcu_data structure fields→nocb_follower_head,→nocb_follower_tail, nocb_follower_count, and nocb_follower_count_lazy. Block 60-4 of FIG. 10 illustrates the checks made in lines 10 and 12. Blocks 60-6 and 60-8 illustrate the callback wait operations invoked in lines 11 and 13. These wait operations are described in more detail below in connection with FIGS. 11-12 and 13-14, respectively.

Lines 14-24 move RCU callbacks from the callbacks-ready queue 56-3 of the associated rcu_data structure 56 to the callbacks-invoke queue 58 of the rcuo kthread 38A running the rcu_nocbs_kthread( ) function 60, using pointer operations to dequeue the callbacks from the former and enqueue them on the latter, then reinitializing the first queue. These operations are illustrated by block 60-10 of FIG. 10. Line 14 picks up the callback-ready queue's head pointer to use as the head of the callbacks-invoke queue 58, line 15 complains if the callbacks-ready queue is empty (in which case the wait should have waited longer), line 16 does event tracing, line 17 NULLs out the callbacks-ready queue, line 18 picks up the callback-ready queue's tail pointer to use as the tail of the callbacks-invoke queue, then resets the callback-ready queue's tail pointer to reference the header (so that the next enqueue starts with an empty queue), and lines 19 and 20 fetch and zero the →nocb_follower_count and →nocb_follower_count_lazy counters on the callback-ready queue 56-3, using the local count variables c and c1. Lines 21 and 22 add these two counts to the →nocb_p_count and →nocb_p_count_lazy counters associated with the callbacks-invoke queue 58, and line 23 does more event tracing. Line 24 zeros the two local count variables c and c1 in preparation for entering the callback invocation loop spanning lines 25-42.

Inside the loop spanning lines 25-42, a loop spanning lines 26-34 checks for late entrants on the callbacks-ready queue 56-3 and adds them to the callbacks-invoke queue 58. These operations are illustrated by block 62-12 in FIG. 10. Line 26 fetches a pointer to the second callback on the callbacks-invoke queue 58. If line 27 determines that there is only one callback on this queue, and that this is not the last callback (based on the tail pointer fetched back on line 18), then lines 28-33 do event tracing, sleep one jiffy, refetch the pointer to the second callback, and return to line 27 to redo the check. This loop handles the possibility that callbacks might have been enqueued on the callbacks-ready queue just as lines 14-22 dequeued the full queue.

Lines 35-40 invoke the RCU callbacks on the callbacks-invoke queue 58. These operations are illustrated by block 60-14 of FIG. 10. Line 35 interacts with a debug-objects subsystem (not shown) to mark the current callback as "invoked", so that the debug-objects subsystem won't complain if it is passed to call_rcu( ) again in the future. Line 36 disables bottom-half processing in order to match the environment that RCU callbacks are invoked in for non-No-CBs CPUs. Line 37 calls_rcu_reclaim( ) to invoke the callback, and if_rcu_reclaim( ) determines that the callback was lazy, line 38 increments the count of lazy callbacks. Either way, line 39 increments the total count of callbacks, and then line 40 re-enables bottom-half processing. Line 41 picks up the pointer to the next callback in preparation for the next pass through the loop starting at line 25.

Once all the callbacks have been invoked by the loop spanning lines 25-42, line 43 does yet more event tracing, lines 44 and 45 adjust the→nocb_p_count and→nocb_p_count_lazy fields to account for the callbacks just now invoked, and line 46 updates the→n_nocbs_invoked field that tracks the total number of callbacks invoked for this rcu_data structure 56 since boot. The latter operation is illustrated by block 60-16 of FIG. 10. Finally, line 48 would return zero to the kernel's kthread system (not shown), except that the loop spanning lines 9-47 never terminates. Thus, the only purpose of line 48 is to placate compilers that would otherwise complain about a non-void function not returning a value.

Figure 12:
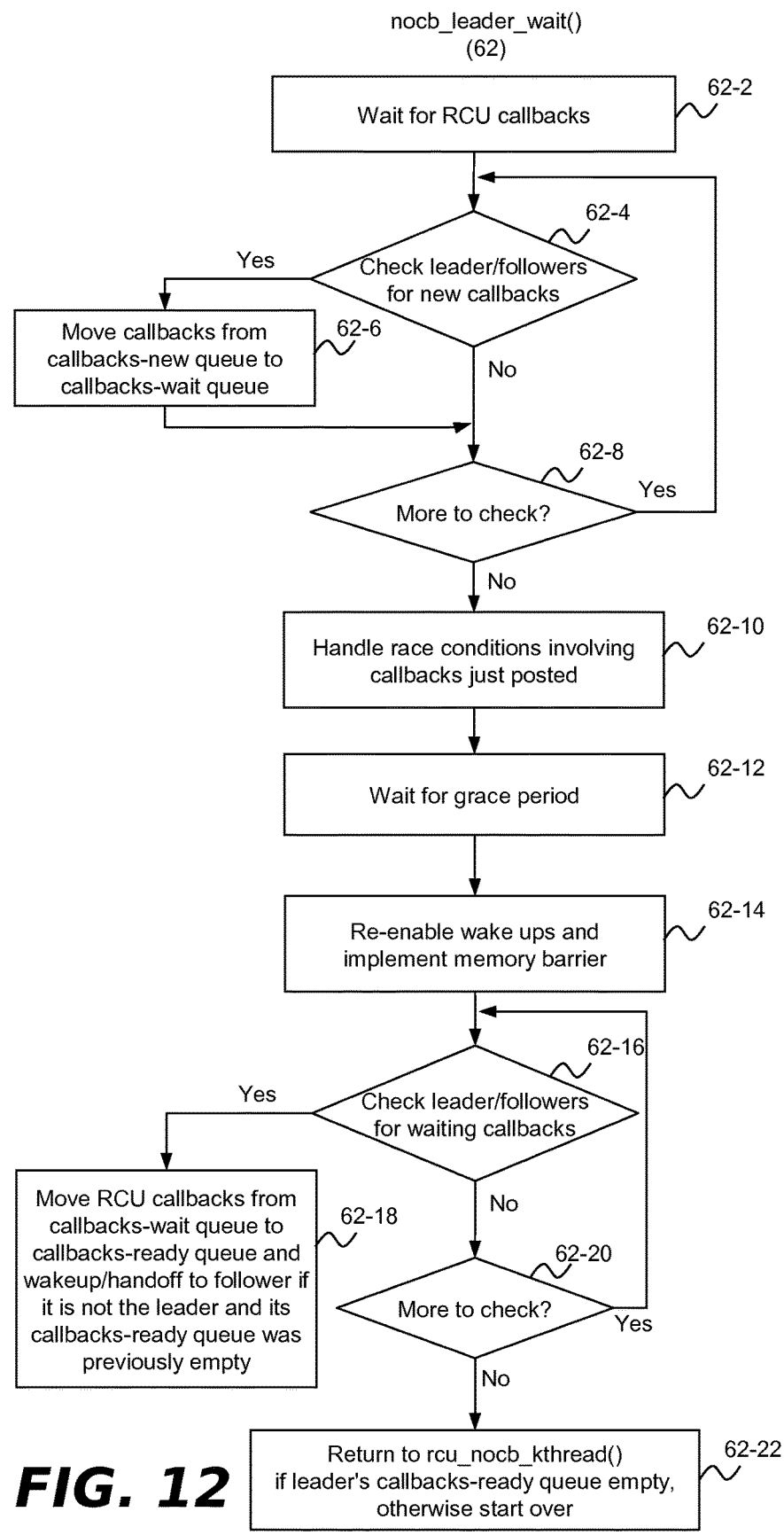
FIG. 12 is a flow diagram showing example operations performed by the nocb_leader_wait( ) function of FIG. 11.

FIG. 11 illustrates example C-language source code that may be used to implement a nocb_leader_wait( ) function 62, which is the callback waiting function called on line 11 of the rcu_nocb_kthread( ) function 60 shown in FIG. 9. FIG. 12 is a corresponding flow diagram. Because the leader rcuo kthread 38A handles grace periods for all of its followers, where the leader is considered to be one of its own followers, this function may do work even during times when there are absolutely no callbacks queued for the leader. To this end, the processing may be summarized as follows:

1. Lines 9-16 wait for something requiring the leader's attention. This is illustrated by block 62-2 of FIG. 12.
2. Lines 17-28 check to see if any callbacks have been newly queued on the callbacks-new queue 56-1 for the leader and each of its followers, and if so, moves them to the callbacks-wait queue 56-2, adjusting the callback and lazy callback counters of each queue. This is illustrated by blocks 62-4, 62-6 and 62-8 of FIG. 12.
3. Lines 29-43 handle race conditions involving callbacks being posted just as the leader processes them. Such handling includes the use of a memory barrier. This is illustrated by block 62-10 of FIG. 12.
4. Line 44 waits for a grace period to elapse. This is illustrated by block 62-12 of FIG. 12.
5. Lines 45 and 46 re-enable leader wakeups to the leader rcuo kthread 38A (which were disabled when the leader rcuo kthread was awakened) and implement a memory barrier. This is illustrated by block 62-14 of FIG. 12. The leader rcuo kthreads 38A use kthread status flags and memory barriers to ensure that callback handoffs to their follower rcuo kthreads avoid races with new postings of RCU callbacks
6. Lines 47-60 check for waiting callbacks on the callbacks-wait queue 56-2 for the leader and each of its followers, and if found, move these now-ready callbacks to the callbacks-ready queue 56-3, and then wake up any follower rcuo kthread that is not the leader and whose callbacks-ready queue was previously empty. This is illustrated by blocks 62-16, 62-18 and 62-20 of FIG. 12.
7. Lines 61 and 62 check to see if the leader has any callbacks to invoke. This is illustrated by block 62-22 of FIG. 12.

Turning now to the details of the code listing of FIG. 11, line 9 checks rcu_nocb_poll (which is a boot parameter) to see if this is a polling implementation, which avoids the need for call_rcu( ) to do expensive wake-up operations. If not, line 10 does tracing and lines 11 and 12 wait for the wake-up from a call_rcu( ) invocation. Otherwise, if this is a polling implementation, line 13 checks to see if this is the first time through the loop for this invocation of nocb_leader_wait( ), and if it is, line 14 remembers that the first time has already happened and line 15 does tracing. The purpose of this first time check is to keep polling implementations from overflowing an event-trace log.

Line 17 initializes a gotcbs flag, and each pass through the loop spanning lines 18-28 checks for callbacks to be invoked on each follower. Again, a leader is considered to be one of its own followers for this purpose. Line 19 begins the process of moving recently posted callbacks from the follower's callbacks-new queue 56-1 to the callbacks-wait queue 56-2, where they will wait for a grace period. If line 20 determines that the current follower has no callback recently queued, line 21 skips to the next follower. Otherwise, lines 22-26 complete the task of moving the recently received callbacks from the callbacks-new queue 56-1 to the callbacks-wait queue 56-2. Line 27 notes that there are callbacks that need to wait for a grace period, setting the gotcbs flag.

Line 29 checks to see if there are no callbacks that need to wait for a grace period, and if not (i.e., if there are callbacks), skips ahead to line 44 to wait for a grace period. One reason there might not be callbacks is that rcu_nocb_poll indicates that this is a polling implementation, so that many of the passes through the polling loop would find no callbacks posted. If line 29 determines there are no callbacks, execution continues with line 30, which checks for polling, so that only non-polling does the tracing on line 31, again to avoid flooding the event-trace log. Line 33 flushes signals (to account for the possibility that a POSIX signal was sent to the rcuo kthread 38A), line 34 blocks for a jiffy (or until the next wakeup, whichever comes first), and line 35 re-enables leader wakeups (which have been disabled since the leader rcuo kthread 38A was awakened). The memory-barrier instruction on line 36 ensures that the leader-wakeup reenabling happens before the scan for more recently posted callbacks.

The loop spanning lines 37-41 checks all followers for recently posted callbacks, thus avoiding a race where a callback is posted just before leader wakeups were re-enabled, which could otherwise result in a system hang. If line 38 sees that there are any such callbacks, line 39 pretends that another leader wakeup occurred, which will short-circuit the next wait on lines 11 and 12. Lines 40 and 42 then transfer control back to the beginning of the nocb_leader_wait function 62 (at line 8) in order to handle the next set of callbacks.

Line 44 waits for a grace period to elapse, after which all of the callbacks in the followers' callbacks-wait queue 56-2 are ready to be advanced to the callbacks-ready queue 56-3. However, in order to avoid hangs caused by races with new callback postings, it is necessary to re-enable leader wakeups (line 45) before re-checking for the newly posted callbacks. The memory-barrier instruction on line 46 enforces this ordering.

Each pass through the loop spanning lines 47-60 moves callbacks from the callbacks-wait queue 56-2 to the callbacks-ready queue 56-3 for one follower, wakes up that follower, and checks for newly posted callbacks that might have arrived while leader wakeups were disabled. Line 48 checks for newly arrived callbacks for the current follower (which could be the leader itself), and if there are some, line 49 short-circuits the next leader_wait on lines 11 and 12. Line 50 checks whether this follower had any callbacks on the callbacks-wait queue 56-2 that were waiting for the recently completed grace period, and if not, line 51 advances to the next follower. On the other hand, if there are callbacks on the callbacks-wait queue 56-2, lines 52-56 move them to the follower's callbacks-ready queue 56-3. If line 57 determines that this follower is not the leader and that the follower's callbacks-ready queue 56-3 was previously empty, then line 58 wakes up the follower. The leader does not need to wake itself up. Moreover, if the callbacks-ready queue 56-3 was not previously empty, the follower has already been awakened. Note that one possible enhancement is to check the follower's→nocb_follower_count→callback count field for its callbacks-ready queue 56-3, and if it is too large, redo the wakeup anyway. This would be useful if wakeups could be lost for any reason.

If line 61 determines that the leader's callbacks-ready queue 56-3 is empty, then line 62 starts over from the beginning of the nocb_leader_wait( ) function 62 (at line 8). Otherwise, nocb_leader_wait( ) function 62 returns to the caller (i.e., the rcu_nocb_kthread( ) function 60) to allow the callbacks on the callbacks-ready queue 56-3 to be moved to the callbacks-invoke queue 58 and invoked.

FIG. 13 illustrates example C-language source code that may be used to implement a nocb_follower_wait( ) function 64, which is the callback waiting function called on line 13 of the rcu_nocb_kthread( ) function 60 shown in FIG. 9. FIG. 14 is a corresponding flow diagram. The nocb_follower_wait( ) function 64 is analogous to the nocb_leader_wait( ) function 62, but for followers rather than leaders. This function is quite a bit simpler, as it need only wait for its own callbacks.

Each pass through the loop spanning lines 5-23 represents one attempt to find new callbacks on the callbacks-ready queue 56-3 that are now ready to be invoked by this follower rcu0 kthread. This is shown by blocks 64-2 and 64-4 of FIG. 14. Lines 6-14 perform one wait operation, with the approach selected by the rcu_nocb_poll variable. If line 6 determines that the rcu_nocb_poll variable indicates that polling is not in effect, then lines 7 and 8 do event tracing and lines 9 and 10 wait for the next follower wakeup from the nocb_leader_wait( ) function 62 (e.g., the wake-up on line 58 of FIG. 11). Otherwise, if line 11 sees that this is the first time through the loop, line 12 records that the thread processing has passed through the loop and line 13 does event tracing. The reason for this firsttime check is to prevent polling from flooding the event-trace log.

If line 15 determines that callbacks are ready to invoke on the callbacks-ready queue 56-3, line 16 returns to the caller (i.e., the rcu_nocb_kthread( ) function 60), which will move the callbacks to the callbacks-invoke queue 58 for this follower rcuo kthread and invoke them. The purpose of the smp_load_acquire( ) is to ensure that the list-empty check precedes any callback invocation. If there are no ready-to-invoke callbacks, lines 18-22 prepare for the next pass through the loop. If line 18 sees that polling is not in effect, lines 19 and 20 do event tracing. Otherwise, tracing is omitted to avoid flooding the event-trace log. Line 21 deals with the possibility that a POSIX signal could have been sent to this follower rcuo kthread, and line 22 waits for one jiffy.

Accordingly, a technique has been disclosed for improving the scalability of RCU callback offloading, thereby improving the operation of a computer system that implements read-copy update. It will be appreciated that the foregoing concepts may be variously embodied in any of a data processing system, a machine implemented method, and a computer program product in which programming logic is provided by one or more computer readable data storage media for use in controlling a data processing system to perform the required functions. Example embodiments of a machine-implemented method and data processing system were previously described in connection with FIGS. 4-14.

With respect to a computer program product, digitally encoded program instructions may be stored on one or more computer readable data storage media for use in controlling a computer or other information handling machine or device to perform the required functions. The program instructions may be embodied as machine language code that is ready for loading and execution by the machine apparatus, or the program instructions may comprise a higher level language that can be assembled, compiled or interpreted into machine language. Example languages include, but are not limited to C, C++, assembly, to name but a few. When implemented on a machine comprising a processor, the program instructions combine with the processor to provide a particular machine that operates analogously to specific logic circuits, which themselves could be used to implement the disclosed subject matter.

Figure 15:
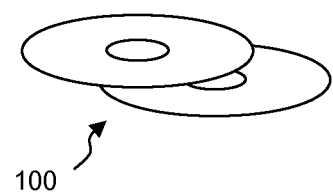
FIG. 15 is a diagrammatic illustration showing example computer readable data storage media that may be used to provide a computer program product.

Example computer readable data storage media for storing such program instructions are shown by reference numerals 8 (memory) and 10 (cache) of the computer system 2 of FIG. 4. The computer system 2 may further include one or more secondary (or tertiary) storage devices (not shown) that could store the program instructions between system reboots. The computer system 2 could also store information on one or more remote servers (not shown), which would also include a computer readable storage medium for storing program instructions as described herein. A further example of a computer readable data storage medium that may be used to store the program instructions would be portable optical storage disks of the type that are conventionally used for commercial software sales, such as compact disk-read only memory (CD-ROM) disks, compact disk-read/write (CD-R/W) disks, and digital versatile disks (DVDs). Examples of such media are shown by reference number 100 in FIG. 15.

The computer readable storage medium can thus be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program code described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program code from the network and forwards the computer readable program code for storage in a computer readable storage medium within the respective computing/processing device.

Computer readable program code for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). As previously mentioned, in some embodiments, electronic circuitry including, for example, programmable logic circuitry, field-programmable gate arrays (FPGA), or programmable logic arrays (PLA) may execute the computer readable program code by utilizing state information of the computer readable program code to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program code.

The computer readable program code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program code may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program code may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although various example embodiments have been shown and described, it should be apparent that many variations and alternative embodiments could be implemented in accordance with the disclosure. It is understood, therefore, that the invention is not to be in any way limited except in accordance with the spirit of the appended claims and their equivalents.

What is claimed is:

1. A method for scaling Read-Copy Update (RCU) callback offloading, comprising:
designating a set of CPUs in a computer system as no-callbacks (No-CBs) CPUs that do not perform RCU callback processing;
spawning a set of RCU callback offload kernel threads (rcuo kthreads) that are each assigned to one of said No-CBs CPUs to invoke RCU callbacks generated by workloads running on said No-CBs CPUs at CPUs that are not No-CBs CPUs:
establishing groups of said rcuo kthreads, each rcuo kthread group having one leader rcuo kthread and one or more follower rcuo kthreads;
periodically waking up said leader rcuo kthreads without waking up said follower rcuo kthreads when an RCU grace period ends and an RCU callback needs to be invoked, or when a new RCU callback arrives and a new RCU grace period needs to be started; and
said leader rcuo kthreads periodically waking up their associated follower rcuo kthreads for which said leader rcuo kthreads have sole responsibility to wake.

2. The method of claim 1, wherein the number of said rcuo kthread groups is substantially the square root of the number of said CPUs.

3. The method of claim 1, wherein each of said No-CBs CPUs has a set of associated callback queues that accumulate RCU callbacks to be processed at different times, and wherein each of said leader rcuo kthreads advances said RCU callbacks through said callback queues on behalf of each rcuo kthread in its group until said RCU callbacks are ready for invocation.

4. The method of claim 3, wherein said rcuo kthreads each have an associated callback queue for said RCU callbacks that are actively being invoked, said leader rcuo kthreads and said follower rcuo kthreads each managing their own said associated callback queue.

5. The method of claim 3, wherein said leader rcuo kthreads wake up their follower rcuo kthreads when said follower rcuo kthreads have RCU callbacks that are ready for invocation so that said follower rcuo kthreads can invoke their RCU callbacks.

6. The method of claim 4, wherein said leader rcuo kthreads perform any necessary RCU grace period waiting on behalf of their follower rcuo kthreads so that said follower rcuo kthreads do not need to separately wait for RCU grace periods.

7. The method of claim 1, wherein said leader rcuo kthreads use kthread status flags and memory barriers to ensure that callback handoffs to said follower rcuo kthreads avoid races with new postings of said RCU callbacks.

8. A system, comprising:
a plurality of CPUs;
a memory coupled to said CPUs, said memory including a computer readable storage medium tangibly embodying at least one program of instructions executable by said CPUs to perform operations for scaling Read-Copy Update (RCU) callback offloading, said operations comprising:
designating a set of said CPUs in said system as no-callbacks (No-CBs) CPUs that do not perform RCU callback processing;
spawning a set of RCU callback offload kernel threads (rcuo kthreads) that are each assigned to one of said No-CBs CPUs to invoke RCU callbacks generated by workloads running on said No-CBs CPUs at CPUs that are not No-CBs CPUs:
establishing groups of said rcuo kthreads, each rcuo kthread group having one leader rcuo kthread and one or more follower rcuo kthreads;
periodically waking up said leader rcuo kthreads without waking up said follower rcuo kthreads when an RCU grace period ends and an RCU callback needs to be invoked, or when a new RCU callback arrives and a new RCU grace period needs to be started; and
said leader rcuo kthreads periodically waking up their associated follower rcuo kthreads for which said leader rcuo kthreads have sole responsibility to wake.

9. The system of claim 8, wherein the number of said rcuo kthread groups is substantially the square root of the number of said CPUs.

10. The system of claim 8, wherein each of said No-CBs CPUs has a set of associated callback queues that accumulate RCU callbacks to be processed at different times, and wherein each of said leader rcuo kthreads advances said RCU callbacks through said callback queues on behalf of each rcuo kthread in its group until said RCU callbacks are ready for invocation.

11. The system of claim 10, wherein said rcuo kthreads each have an associated callback queue for said RCU callbacks that are actively being invoked, said leader rcuo kthreads and said follower rcuo kthreads each managing their own said associated callback queue.

12. The system of claim 10, wherein said leader rcuo kthreads wake up their follower rcuo kthreads when said follower rcuo kthreads have RCU callbacks that are ready for invocation so that said follower rcuo kthreads can invoke their RCU callbacks.

13. The method of claim 12, wherein said leader rcuo kthreads perform any necessary RCU grace period waiting on behalf of their follower rcuo kthreads so that said follower rcuo kthreads do not need to separately wait for RCU grace periods.

14. The system of claim 8, wherein said leader rcuo kthreads use kthread status flags and memory barriers to ensure that callback handoffs to said follower rcuo kthreads avoid races with new postings of said RCU callbacks.

15. A computer program product, comprising:
one or more computer readable data storage media;
program instructions stored on said one or more computer readable data storage media for programming a data processing platform having a plurality of CPUs to perform operations for scaling Read-Copy Update (RCU) callback offloading, said operations comprising:
designating a set of said CPUs on said data processing platform as no-callbacks (No-CBs) CPUs that do not perform RCU callback processing;
spawning a set of RCU callback offload kernel threads (rcuo kthreads) that are each assigned to one of said No-CBs CPUs to invoke RCU callbacks generated by workloads running on said No-CBs CPUs at CPUs that are not No-CBs CPUs:
establishing groups of said rcuo kthreads, each rcuo kthread group having one leader rcuo kthread and one or more follower rcuo kthreads;
periodically waking up said leader rcuo kthreads without waking up said follower rcuo kthreads when an RCU grace period ends and an RCU callback needs to be invoked, or when a new RCU callback arrives and a new RCU grace period needs to be started; and said leader rcuo kthreads periodically waking up their associated follower rcuo kthreads for which said leader rcuo kthreads have sole responsibility to wake.

16. The computer program product of claim 15, wherein the number of said rcuo kthread groups is substantially the square root of the number of said CPUs.

17. The computer program product of claim 15, wherein each of said No-CBs CPUs has a set of associated callback queues that accumulate RCU callbacks to be processed at different times, and wherein each of said leader rcuo kthreads advances said RCU callbacks through said callback queues on behalf of each rcuo kthread in its group until said RCU callbacks are ready for invocation.

18. The computer program product of claim 17, wherein said rcuo kthreads each have an associated callback queue for said RCU callbacks that are actively being invoked, said leader rcuo kthreads and said follower rcuo kthreads each managing their own said associated callback queue.

19. The computer program product of claim 17, wherein said leader rcuo kthreads wake up their follower rcuo kthreads when said follower rcuo kthreads have RCU callbacks that are ready for invocation so that said follower rcuo kthreads can invoke their RCU callbacks, and wherein said leader rcuo kthreads perform any necessary RCU grace period waiting on behalf of their follower rcuo kthreads so that said follower rcuo kthreads do not need to separately wait for RCU grace periods.

20. The computer program product of claim 15, wherein said leader rcuo kthreads use kthread status flags and memory barriers to ensure that callback handoffs to said follower rcuo kthreads avoid races with new postings of said RCU callbacks.

* * * * *